United States Patent
Augustsson

(12) 
(10) Patent No.: US 6,452,718 B1
(45) Date of Patent: Sep. 17, 2002

(54) WDM-CHANNEL EQUALIZER

(75) Inventor: Torsten Augustsson, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/410,046

(22) Filed: Oct. 1, 1999

(30) Foreign Application Priority Data

Oct. 2, 1998 (SE) ............................................. 9803348

(51) Int. Cl.$^7$ ............................................... H01S 3/00
(52) U.S. Cl. .................... 359/337.1; 359/349
(58) Field of Search .................... 359/337.1, 337.4, 359/337

(56) References Cited

U.S. PATENT DOCUMENTS

| | | |
|---|---|---|
| 5,392,154 A | 2/1995 | Chang et al. |
| 5,598,294 A * | 1/1997 | Uno et al. ................. 359/341 |
| 5,636,301 A * | 6/1997 | O'Sullivan et al. ........... 385/24 |
| 5,933,270 A * | 8/1999 | Toyohara .................... 359/341 |

FOREIGN PATENT DOCUMENTS

| | | | |
|---|---|---|---|
| EP | 0617527 | | 9/1994 |
| EP | 0924888 | | 6/1999 |
| GB | 2293936 | | 4/1996 |
| GB | 2351863 | A * | 10/2001 |

* cited by examiner

Primary Examiner—Mark Hellner
(74) Attorney, Agent, or Firm—Burns, Doane, Swecker & Mathis, LLP

(57) ABSTRACT

The present invention relates to an arrangement and a method relating to optical channel equalizers. The channel equalizer includes at least one Q-port direction-dependent router (40), where $Q \geq 3$, one N-channel WDM (de) multiplexer (30), where $N \geq 2$, N-number of amplifying waveguides (31, 32, 33, 34, 35, 36, 37 and 38), at least N-number of fiber amplifiers (51, 52, 53, 54, 55, 56, 57 and 58), at least N-number of Bragg gratings (61, 62, 63, 64, 65, 66, 67 and 68), at least N-number of variable optical pump laser attenuators (71, 72, 73, 74, 75, 76, 77 and 78), at least one optical splitter (20 and 22) and at least one pump laser (10, 12, 14 and 16) per optical splitter (20 and 22). At least one of the ports (42, 44 and 46) on the direction-dependent router (40) is disposed on a first side of the WDM (de) multiplexer (30). Each amplifying waveguide (31, 32, 33, 34, 35, 36, 37 and 38) includes at least one fiber amplifier (51, 52, 53, 54, 55, 56, 57 and 58) and at least one Bragg grating (61, 62, 63, 64, 65, 66, 67 and 68). At least one fiber amplifier (51, 52, 53, 54, 55, 56, 57 and 58) is disposed between a Bragg grating (61, 62, 63, 64, 65, 66, 67 and 68) and the WDM (de)multiplexer (30). At least one variable optical pump laser attenuator (71, 72, 73, 74, 75, 76, 77 and 78) is disposed between each last Bragg grating (61, 62, 63, 64, 65, 66, 67 and 68) and a first side of said optical splitter (20 and 22). The pump laser (10, 12, 14 and 16) is disposed on a second side of the optical splitter (20 and 22).

11 Claims, 5 Drawing Sheets

WDM-CHANNEL EQUALIZER

FIELD OF INVENTION

The present invention relates to an optical device for achieving channel equalizing amplification of the power level of optical wavelength channels.

BACKGROUND ART

Several different methods of increasing the capacity of existing optical networks are known. One way is to use so-called wavelength multiplexing (WDM) techniques to enhance the extent to which available bandwidths can be utilised on an optical fibre in the optical Network. In an optical network, the wavelength can also be used as an information address, that is to say the information can be multiplexed on a number of channels which can then be processed individually in the network. This can result in different channels being subjected to losses of different magnitudes, among other things because the various channels are attenuated to differing degrees in filter structures and in switch structures, because said channels take paths of different lengths through the network, or because said channels are amplified to different extents in optical amplifiers. This imbalance can impair the quality of the transmitted information, since a channel that has a low power level can be easily disturbed by a channel that has a high power level, which is normally referred to as cross-talk.

One known device that achieves channel equalization of optical channels is an equalizer based on multiplexing/demultiplexing elements and variable optical attenuators. The problem with this solution is that the optical channels are equalized by attenuating high power levels. Another problem with this solution is that performance impairing interference powers can occur.

SUMMARY OF THE INVENTION

Any one of a number of known methods can be used to increase the capacity of an optical transmission system. In the case of wavelength multiplexing for instance, transmission channels are multiplexed and demultiplexed on different carrier wave lengths to and from an information stream respectively, This multiplexing and demultiplexing requires the presence of optical wavelength selective devices. Different transmission channels are subjected to losses of different high magnitudes, among other things because the various transmission channels are attenuated to different extents in filter and switch structures, because said channels pass through the network in paths of mutually different lengths, or because the channels are amplified to different extents in optical amplifiers.

One problem with known channel equalizers is that they attenuate the highest channel-power levels, which is a waste of power and can considerably impair performance.

Another problem with known channel equalizers is that they are sensitive to interference powers, which can result in further impairment of performance.

The present invention addresses these problems with an optical channel equalizer that includes at least one direction-dependent router that has Q-number of ports, where $Q \geq 3$, one WDM (de)multiplexer that has N-number of channels, where $N \geq 2$, N-number of amplifying waveguides, where each amplifying waveguide includes at least one fibre amplifier and at least one Bragg grating, at least N number of variable optical pump laser attenuators, at least one optical splitter, and at least one pump laser per optical splitter. At least one of the ports On the direction-dependent router is disposed on a first side of the N-channel WDM (de)multiplexer. At least one fibre amplifier is disposed between a Bragg grating and the WDM (de)multiplexer. At least one variable optical pump laser attenuator is disposed between each last Bragg grating and a first side of said optical splitter. The pump laser is disposed on the other side of the optical splitter.

In a preferred embodiment of the inventive channel equalizer, the Q-port direction-dependent router is a Q-port optical circulator.

The N-channel WDM (de)multiplexer may, for instance, be an AWG (Arrayed Waveguide Grating) or an MMIMZI (Multi Mode Interference Mach-Zehnder Interferometer).

In another embodiment of the inventive channel equalizer, said equalizer includes at least one Q-port direction-dependent router, where $Q \geq 3$, an N-channel WDM (de)multiplexer, where $N \geq 2$, N-number of amplifying waveguides, where each amplifying waveguide includes at least one fibre amplifier and at least one Bragg grating, and at least one pump laser per amplifying waveguide. At least one of the ports on the direction-dependent router is disposed on a first side of said N-channel WDM (de)multiplexer. At least one fibre amplifier is disposed between a Bragg grating and the WDM (de)multiplexer. The pump laser is disposed at the end of each amplifying waveguide.

In one method according to the present invention for equalizing the power level of optical channels, optical wavelength channels are first transmitted into a first port on a Q-port direction-dependent router. The wavelength channels are then transmitted out through a second port on said router, which is disposed on a first side of an N-channel WDM (de)multiplexer. The wavelength channels are then transmitted through said WDM (de)multiplexer. Different wavelength channels are then transmitted through different amplifying waveguides, For each amplifying waveguide, a wavelength channel passes at least one optical amplifier before being reflected by a Bragg grating. Laser light is pumped into each amplifying waveguide in a direction towards the WDM (de)multiplexer. The reflected optical wavelength channels are transmitted through said WDM (de)multiplexer. These reflected wavelength channels are transmitted in through said second port on said Q-port direction-dependent router, so as to be finally transmitted out through a third port on said router.

The object of the present invention is to provide an arrangement for channel equalizing amplification of the power level of WDM channels, with which channels that have a low power level are amplified to a greater extent that channels that have high power levels. One advantage afforded by the present invention is that dispersion compensation can be made for each channel when the period in the grating structures varies.

Another advantage afforded by the invention is that its performance in other respects can be improved relative to known techniques, for instance with respect to cross-talk and the like.

Another advantage afforded by the present invention is that a high level of reliability can be achieved by using a solution in which at least two pump lasers pump laser light to all fibre amplifiers disposed in the amplifying waveguides, and in which at least one of these pump lasers can be driven harder when replacing a malfunctioning pump laser.

The present invention will now be described in more detail with reference to preferred exemplifying embodiments thereof and also with reference to the accompanying drawings.

DESCRIPTION OF PREFERRED EMBODIMENTS

Figure 1:
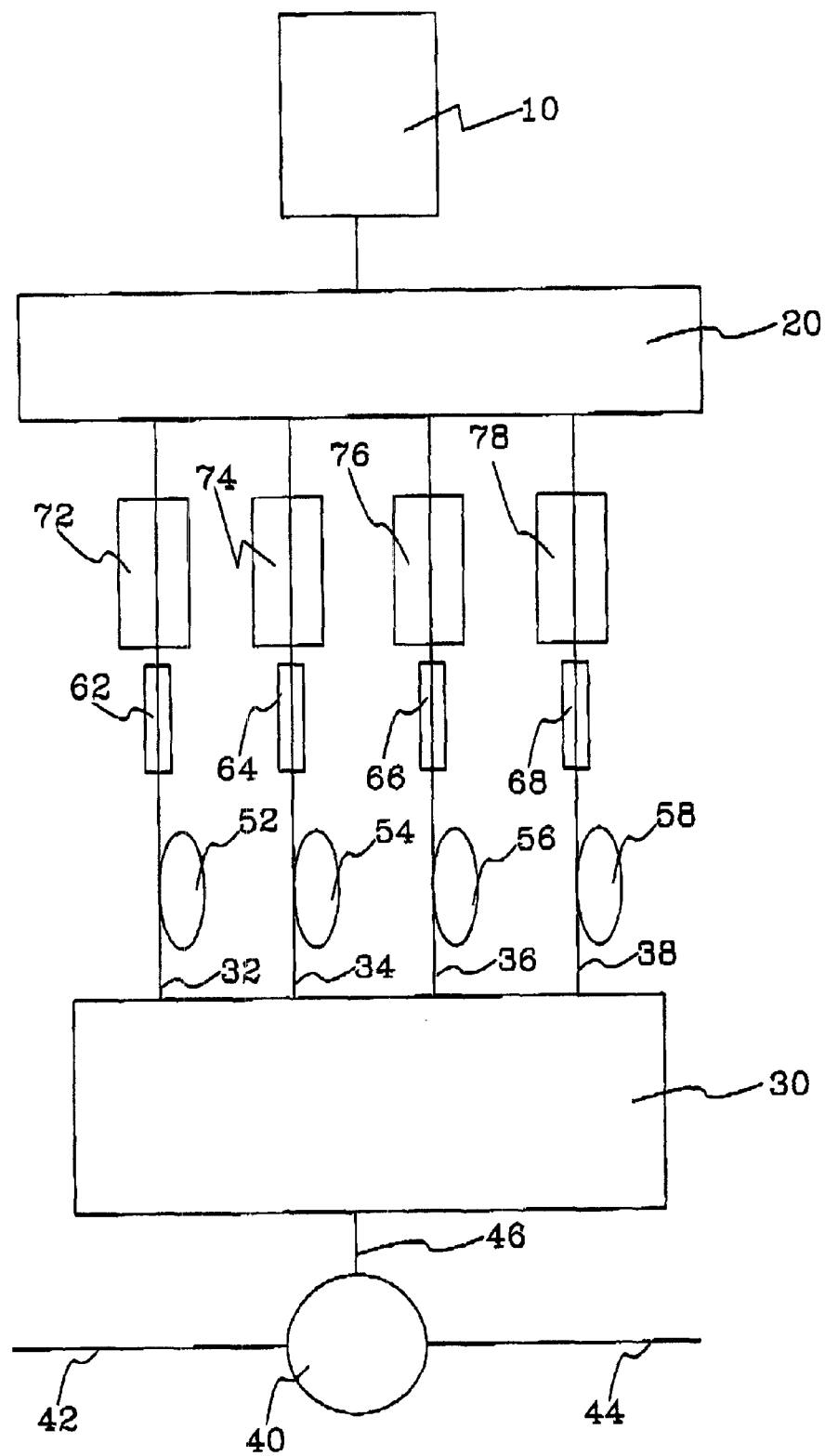
FIG. 1 illustrates an embodiment of an inventive optical channel equalizer.

FIG. 1 illustrates an embodiment of a channel equalizer according to the invention. The channel equalizer includes a pump laser 10, an MMI-based splitter 20, four amplifying waveguides 32, 34, 36 and 38, four fibre amplifiers 52, 54, 56 and 58, four Bragg gratings 62, 64, 66 and 68, four variable optical pump laser attenuators 72, 74, 76 and 78, one four-channel multiplexer/demultiplexer 30 and one three-port optical circulator 40.

One of the ports, 46, of the optical circulator is located on a first side of the four-channel (de)multiplexer 30. Four amplifying waveguides 32, 34, 36 and 38 are provided on a second side of the (de)multiplexer 30. Each amplifying waveguide 32, 34, 36 and 38 includes a fibre amplifier 52, 54, 56 and 58 and a Bragg grating 62, 64, 66 and 68. The fibre amplifiers 52, 54, 56 and 58 are disposed between the (de)multiplexer 30 and respective Bragg gratings 62, 64, 66 and 68. Variable optical pump laser attenuators 72, 74, 76 and 78 are disposed between a second side of the splitter 20 and the Bragg gratings 62, 64, 66 and 68. A pump laser is disposed on a first side of the splitter 20.

Optical wavelength channels are transmitted in through a first port 42 on the optical circulator 40. These wavelength channels pass through the circulator and are transmitted out through a second port 46 on the circulator. The wavelength channels are transmitted into the (de)multiplexer 30 and demultiplexed out on four amplifying waveguides 32, 34, 36 and 38.

At least one wavelength channel is transmitted from the (de)multiplexer 30 to the amplifying waveguide 32, for instance. The wavelength channel passes through and is amplified in the fibre amplifying section 52 a first time, and is then reflected by the Bragg grating 62. This reflected wavelength channel then passes through and is amplified in the fibre amplifier a second time. The variable optical pump laser attenuator 72 disposed between the second side of the splitter 20 and the Bragg grating 62 controls the extent to which the fibre amplifying section shall amplify, i.e. it regulates the effective energy of the pump laser 10 to the fibre amplifier 52. Each of the optical pump laser attenuators 72, 74, 76 and 78 can be handled individually therewith enabling respective signal strengths of the various wavelengths that are demultiplexed out to the various amplifying waveguides 32, 34, 36 and 38 to be regulated separately and independently of each other. The wavelength channels are mutliplexed in the (de)multiplexer 30 after having been reflected by the Bragg gratings 62, 64, 66 and 68. The wavelength channels are transmitted to the second port on the circulator and pass out through a third port on said circulator.

Figure 2:
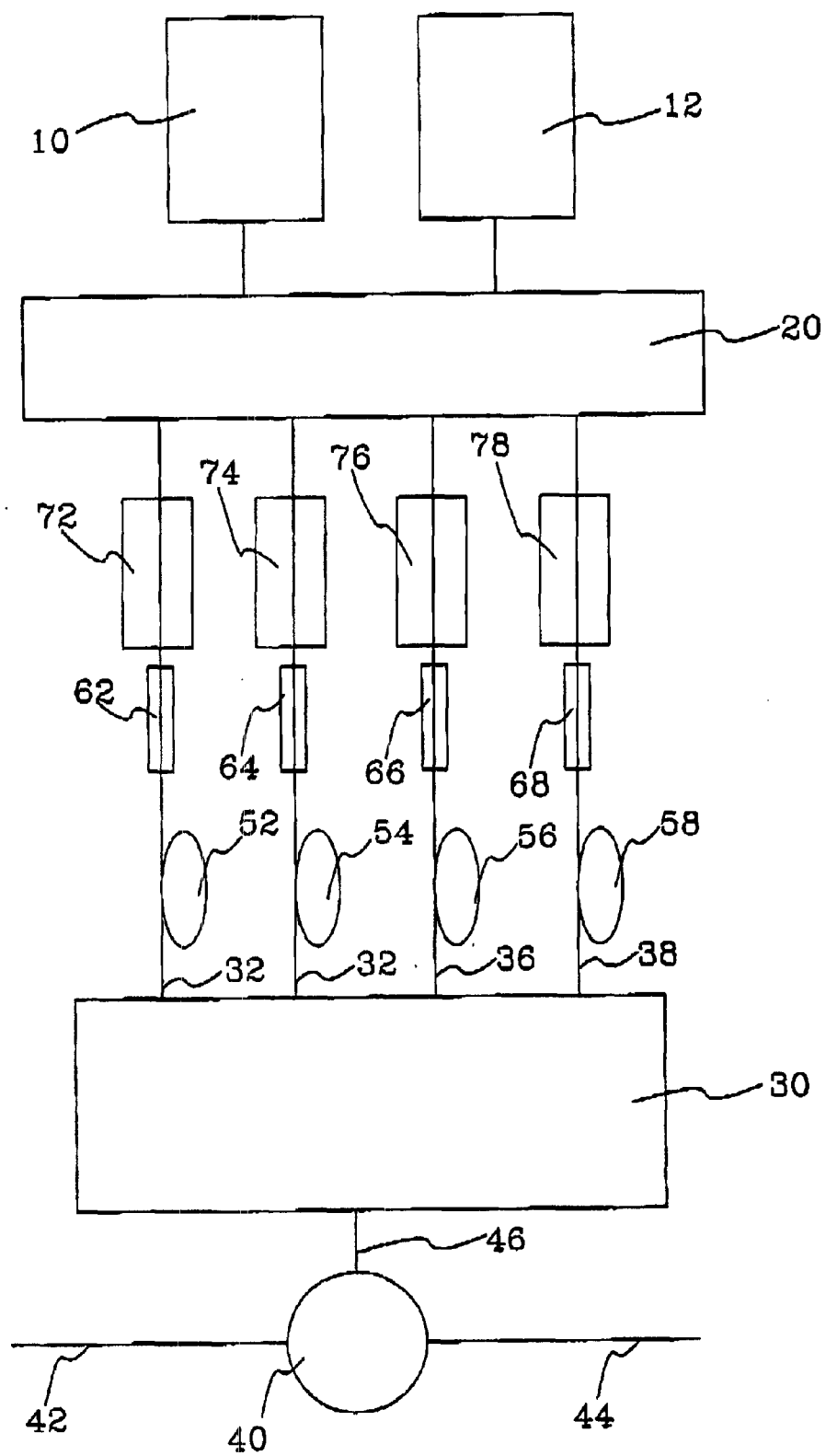
FIG. 2 illustrates another embodiment of an inventive optical channel equalizer.

FIG. 2 illustrates another embodiment of an inventive channel equalizer. The channel equalizer includes two pump lasers 10 and 12, one MMI-based splitter 20, four amplifying waveguides 32, 34, 36 and 38, four fibre amplifiers 52, 54, 56 and 58, four Bragg gratings 62, 64, 66 and 68, four variable optical pump laser attenuators 72, 74, 76 and 78, one four-channel (de)multiplexer 30 and one three-port optical circulator 40.

One of the ports, 46, of the optical circulator is connected to a first side of said four-channel (de)multiplexer 30. Connecting with the second side of the (de)multiplexer 30 are four amplifying waveguides 32, 34, 36 and 38. Each amplifying waveguide 32, 34, 36 and 38 includes a respective fibre amplifier 52, 54, 56 and 58 and a respective Bragg grating 62, 64, 66 and 68. The fibre amplifiers 52, 54, 56 and 58 are disposed between the (de)multiplexer 30 and respective Bragg gratings 62, 64, 66 and 68. Variable optical pump laser attenuators 72, 74, 76 and 78 are disposed between a second side of the splitter 20 and the Bragg gratings 62, 64, 66 and 68. Pump lasers 10 and 12 are disposed on a first side of the splitter 20.

Optical wavelength channels are transmitted in through a first port 42 on the optical circulator 40. These wavelength channels pass through the circulator and are transmitted out through a second port 46 on said circulator. The wavelength channels are transmitted into the (de)multiplexer 30 and are demultiplexed out on four amplifying waveguides 32, 34, 36 and 38.

At least one wavelength channel is transmitted from the (de)multiplexer 30 to the amplifying waveguide 32, for instance. This wavelength channel passes through and is amplified in the fibre amplifying section 52 for a first time and is then reflected by the Bragg grating 62. The reflected wavelength channel then passes through and is amplified by the fibre amplifier for a second time. The variable attenuator 72 disposed between the second side of the splitter 20 and the Bragg grating 62 controls the extent to which the fibre amplifying section amplifies, i.e. it regulates the effective energy of the pump lasers 10 and 12 to the fibre amplifier 52. Each of the optical attenuators 72, 74, 76 and 78 can be handled individually, therewith enabling respective signal strengths of the various wavelengths that are demultiplexed out to the various amplifying waveguides 32, 34, 36 and 38 to be regulated separately and independently of each other. The wavelength channels are multiplexed in the (de)multiplexer 30 after having been reflected by the Bragg gratings 62, 64, 66 and 68. The wavelength channels are transmitted to the second port on the circulator and pass out through a third port thereon.

Figure 3:
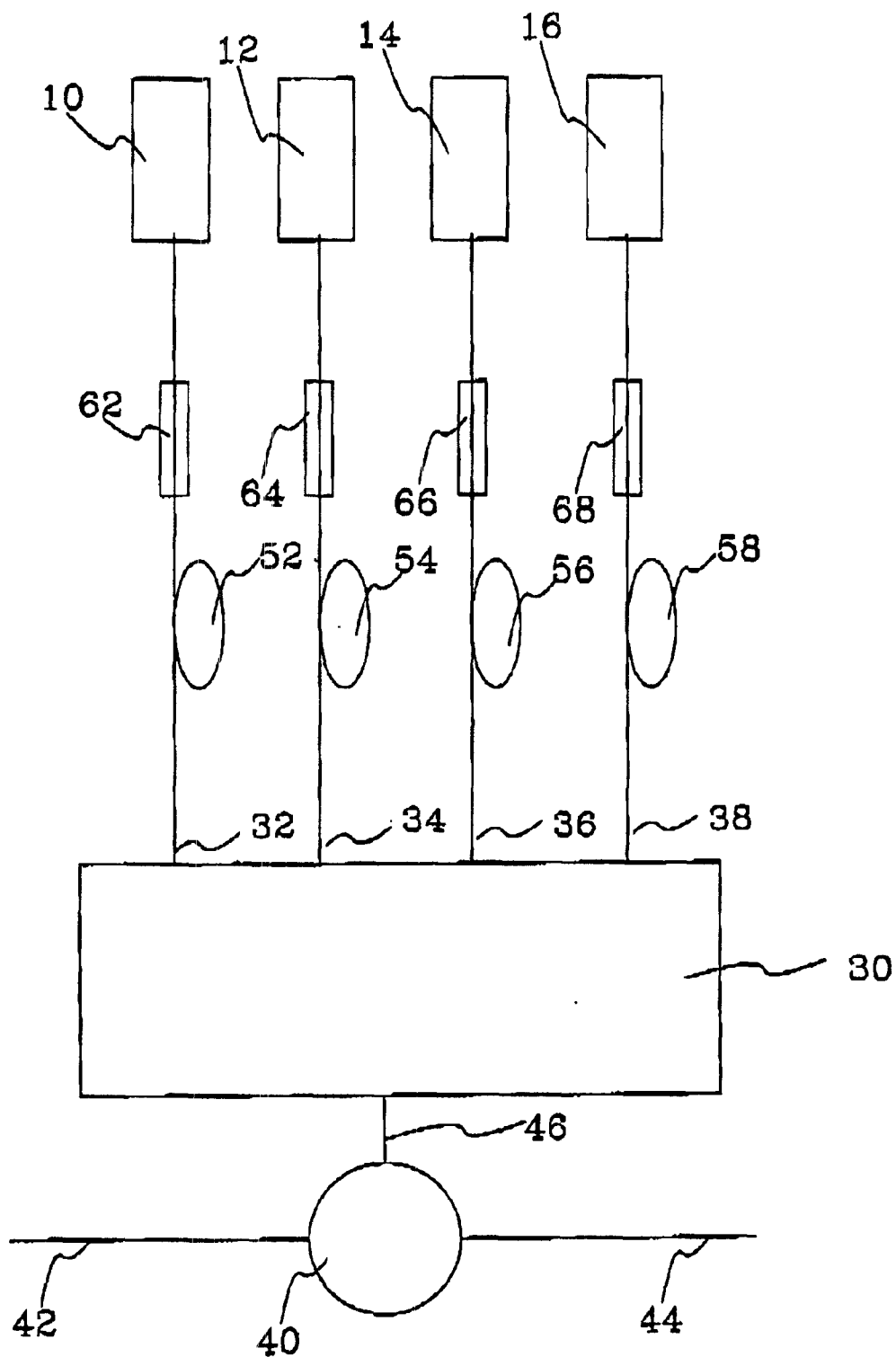
FIG. 3 illustrates yet another embodiment of an inventive optical channel equalizer.

FIG. 3 shows another embodiment of an inventive channel equalizer. The channel equalizer includes four pump lasers 10, 12, 14 and 16, four amplifying waveguides 32, 34, 36 and 36, four fibre amplifiers 52, 54, 56 and 58, four Bragg gratings 62, 64, 66 and 68, one four-channel multiplexer/demultiplexer 30, and one three-port optical circulator 40.

The optical circulator is disposed with one of its ports 46 on a first side of the four-channel (de)multiplexer 30. Disposed on the other side, or second side, of the (de) multiplexer 30 are four amplifying waveguides 32, 34, 36 and 38. Each amplifying waveguide 32, 34, 36 and 38 includes a fibre amplifier 52, 54, 56 and 58 and a Bragg grating 62, 64, 66 and 68. The fibre amplifiers 52, 54, 56 and 58 are disposed between the (de)multiplexer 30 and respective Bragg gratings 62, 64, 66 and 68. A respective pump laser 10, 12, 14 and 16 is disposed at the end of each amplifying waveguide 32, 34, 36 and 38.

Optical wavelength channels are transmitted in through a first port 42 on the optical circulator 40. These wavelength channels pass through the circulator and are transmitted out through a second port 46 on said circulator. The wavelength channels are transmitted into the (de)multiplexer 30 and demultiplexed out on four Mach-Zehnder waveguides 32, 34, 36 and 38.

At least one wavelength channel is transmitted from the (de)multiplexer 30 to the amplifying waveguide 32, for instance. This wavelength channel passes through and is amplified in the fibre amplifying section 52 for a first time and is then reflected by the Bragg grating 62. Said wavelength channel then passes through and is amplified by the fibre amplifier for a second time. Each of the pump lasers can transmit at different powers independently of one another, i.e. respective pump lasers 10, 12, 14 and 16 control the extent to which the fibre amplifiers 52, 54, 56 and 58 shall amplify, therewith enabling the signal strengths of the different wavelengths that are demultiplexed out to the various amplifying waveguides 32, 34, 36 and 38 to be regulated separately and independently of each other. The wavelength channels are multiplexed in the (de)multiplexer 30 after having been reflected by the Bragg gratings 62, 64, 66 and 68. The wavelength channels are transmitted to the second port on the circulator and pass out through a third port thereon.

Figure 4:
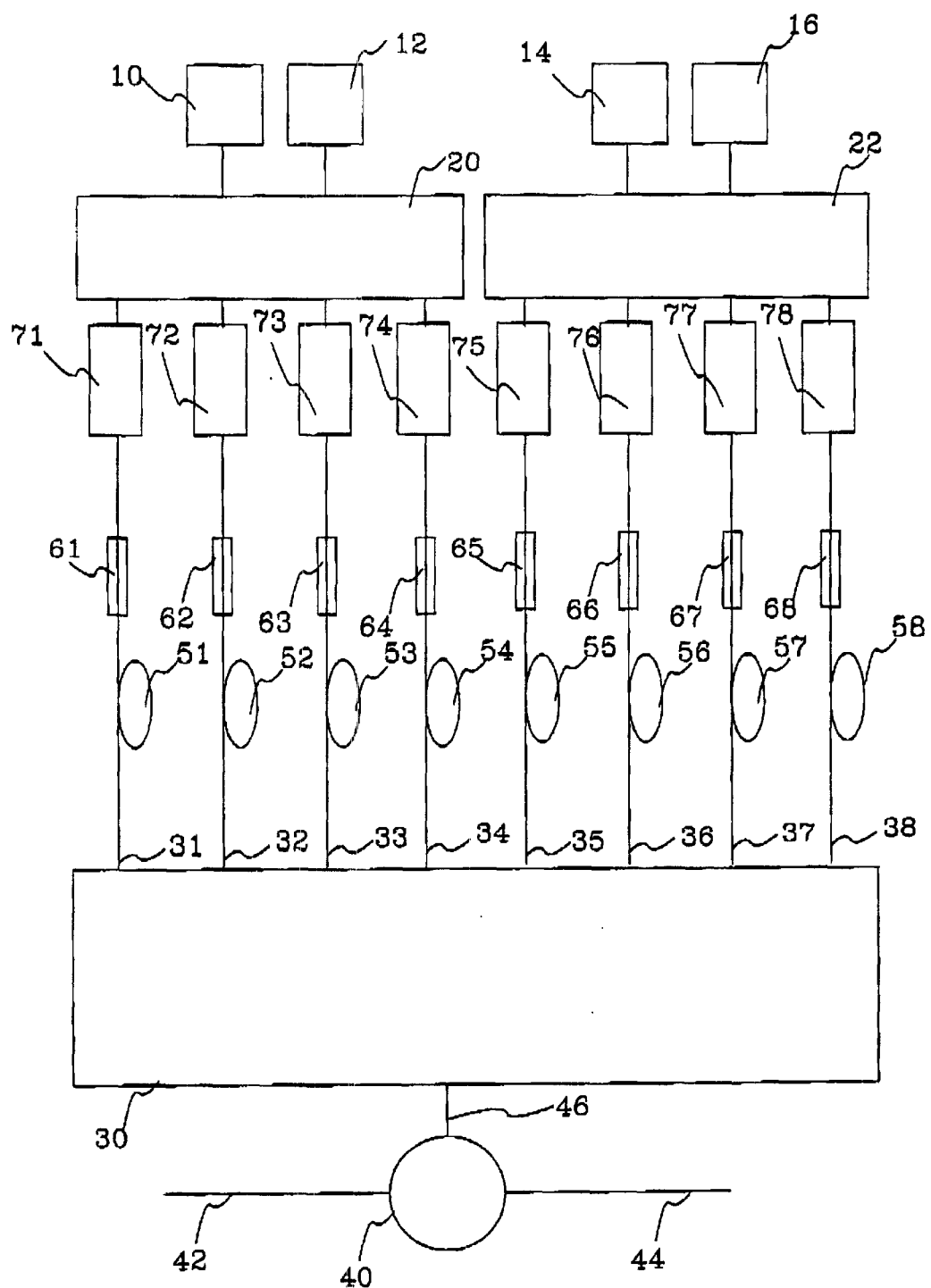
FIG. 4 illustrates still another embodiment of an inventive optical channel equalizer.

FIG. 4 illustrates yet another embodiment of an inventive channel equalizer. The channel equalizer includes four pump laser 10, 12, 14 and 16, two MMI-based splitters 20 and 22, eight amplifying waveguides 31, 32, 33, 34, 35, 36, 37 and 38, eight fibre amplifiers 51, 52, 53, 54, 55, 56, 57 and 58, eight Bragg gratings 61, 62, 63, 64, 65, 66, 67 and 68, eight variable attenuators 71, 72, 73, 74, 75, 76, 77 and 78, one four-channel (de)multiplexer 30 and one three-port optical circulator 40.

One of the ports 46 of the optical circulator is disposed on a first side of the eight-channel (de)multiplexer 30. Disposed on the other side, or second side, of the (de)multiplexer 30 are eight amplifying waveguides 31, 32, is 33, 34, 35, 36, 37 and 38. Each amplifying waveguide 31, 32, 33, 34, 35, 36, 37 and 38 includes a fibre amplifier 51, 52, 53, 54, 55, 56, 57 and 58 and a Bragg grating 61, 62, 63, 64, 65, 66, 67 and 69. The fibre amplifiers 51, 52, 53, 54, 55, 56, 57 and 58 are disposed between the (de)multiplexer 30 and respective Bragg gratings 6i, 62, 63, 64, 65, 66, 67 and 68. Variable optical pump laser attenuators 71, 72, 73, 74, 75, 76, 77 and 78 are disposed between a second side of the splitter 20 and 22 and the Bragg gratings 61, 62, 63, 64, 64, 65, 66, 67 and 68, The pump lasers 10 and 12 are disposed on a first side of the splitter 20 while pump lasers 14 and 16 are disposed on a first side of the splitter 22. The pump lasers 10 and 12 can, advantageously, transmit on different wavelengths. The pump lasers 14 and 16 can also, advantageously, be transmitted on different wavelengths, either the same wavelengths as the pump lasers 10 and 12 or on wavelengths different therefrom.

Optical wavelength channels are transmitted in through a first port 42 on the optical circulator 40. These wavelength channels pass through the circulator and are transmitted out through a second port 46 on said circulator. The wavelength channels are transmitted into the (de)multiplexer 30 and demultiplexed out on eight amplifying waveguides 31, 32, 33, 34, 35, 36, 37 and 28.

For instance, at least one wavelength channel is transmitted from the (de)multiplexer 30 to the amplifying waveguide 31. This wavelength channel passes through and is amplified in the fibre amplifying second 51 for a first time, and is then reflected by the Bragg grating 61. Said wavelength channel then passes through and is amplified in the fibre amplifier for a second time. The variable optical pump laser attenuator 71 disposed between the second side of the splitter 20 and the Bragg grating 61 controls the extent to which the fibre amplifying section shall amplify, in other words it regulates the effective energy delivered by the pump lasers 10 and 12 to the fibre amplifier 52. Each of the optical pump laser attenuators 71, 72, 73, 74, 75, 76, 77 and 78 can be handled individually, therewith enabling respective signal strengths of the various wavelengths that are demultiplexed out to the various amplifying waveguides 31, 32, 33, 34, 35, 36, 37 and 38 to be regulated separately and independently of each other. The wavelength channels are multiplexed in the (de)multiplexer 30 after having been reflected by the Bragg gratings 61, 62, 63, 64, 65, 66, 67 and 68. The wavelength channels are transmitted to the second port on the circulator and pass out through a third port thereon.

Figure 5:
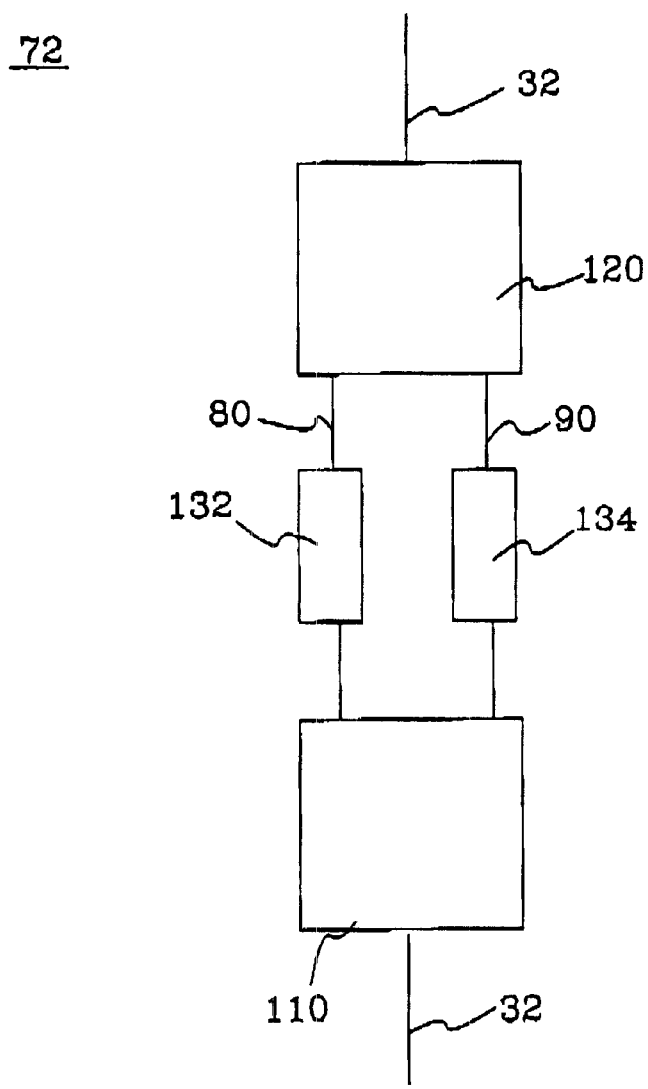
FIG. 5 illustrates an example of a variable attenuator that can be used in conjunction with the invention.

FIG. 5 illustrates a variable optical pump laser attenuator 72 that can be used advantageously in the present invention. The variable attenuator 72 includes two 1×2 MMI waveguides 110 and 120, two Mach-Zehnder waveguides so and 90, one phase control element 132 and one trimming section 134. The MMI waveguides 110 and 120 are interconnected via said two Mach-Zehnder waveguides 80 and 90. A first Mach-Zehnder waveguide 80 includes said phase control element 132, while a second Mach-Zehnder waveguide 90 includes said trimming section 134.

It will be understood that the invention is not restricted to the aforedescribed and illustrated exemplifying embodiments thereof, and that modifications can be made within the scope of the following claims.

What is claimed is:

1. An optical channel equalizer comprising:
   at least one Q-port direction-dependent router, where Q is greater than or equal to 3;
   one 1×N WDM (de)multiplexer, where N is greater than or equal to 2;
   N-number of amplifying waveguides;
   at least N-number of fibre amplifiers;
   and at least N-number of Bragg gratings;
   at least N-number of variable optical pump laser attenuators;
   at least one optical splitter;
   and at least one pump laser per optical splitter,
   wherein at least one of the ports on the direction-dependent router is disposed on a first side of the WDM (de)multiplexer,
   wherein each amplifying waveguide includes at least one further amplifier and at least one Bragg grating, such that at least one fibre amplifier will be disposed between a Bragg grating and the WDM demultiplexer,
   wherein at least one variable optical pump laser attenuator is disposed between each Bragg grating and a first side of said optical splitter,
   and wherein the pump laser is disposed on a second side of the optical splitter.

2. An optical channel equalizer according to claim 1, wherein said Q-port direction-dependent router is a Q-port optical circulator.

3. An optical channel equalizer comprising:
   at least one Q-port direction-dependent router, where Q is greater than or equal to 3;
   one 1×N WDM (de)multiplexer, where N is greater than or equal to two;

N-number of amplifying waveguides;

at least N-number of fibre amplifiers;

at least N-number of Bragg gratings, and;

at least one pump laser per amplifying waveguide, where at least one of the ports on the direction-dependent router is disposed on a first side of the WDM (de)multiplexer, wherein each amplifying waveguide includes at least one fibre amplifier and at least one Bragg grating, wherein at least one fibre amplifier will be disposed between a Bragg grating and the WDM (de)multiplexer, and wherein the pump laser is disposed at the end of each amplifying waveguide.

4. An optical channel equalizer according to claim 3, wherein said Q-port direction-dependent router is a Q-port optical circulator.

5. An optical channel equalizer according to claim 1, wherein the variable optical pump laser attenuators are of the MMIMZI-type (Multi Mode Interference Mach-Zehnder Interferometer) that include two MMI waveguides which are interconnected via two Mach-Zehnder waveguides, and where a first Mach-Zehnder waveguide includes at least one trimming section and a second Mach-Zehnder waveguide includes at least one phase control element.

6. An optical channel equalizer according to claim 1, wherein at least one laser transmits at a wavelength which is different than the wavelength transmitted by remaining lasers, when at least two pump lasers are provided for each optical splitter.

7. An optical channel equalizer according to claim 1, wherein the optical splitter is an MMI-type splitter.

8. A method of equalizing the power level of optical channels comprising the steps of:

transmitting optical wavelength channels into a first port of a Q-port direction-dependent router;

transmitting said wavelength channels out through a second port on said router, which is disposed on a first side of a WDM (de)multiplexer;

transmitting the wavelength channels through said WDM (de)multiplexer;

transmitting the various wavelength channels through different amplifying waveguides;

passing a wavelength channel through at least one optical amplifier for each amplifying waveguide prior to said wavelength channel being reflected by a Bragg grating, pumping laser light into each amplifying waveguide in a direction towards said WDM (de)multiplexer;

transmitting the reflected optical wavelength channels through said WDM (de)multiplexer; and transmitting the reflected wavelength channels in through said second port on said Q-port direction-dependent router and then transmitting said wavelength channels out through a third port on said router.

9. A method according to claim 8, wherein said laser light is pumped into each amplifying waveguide by separate lasers disposed at the end of each amplifying waveguide.

10. A method according to claim 8, wherein said laser light is pumped into each amplifying waveguide by at least one laser connected to amplifying waveguides via one optical pump laser attenuator per amplifying waveguide and at least one optical splitter.

11. A method according to claim 8, where the laser light is sent from at least two lasers per splitter, and where at least one laser wavelength is separate from the other wavelengths.

* * * * *